United States Patent [19]

Thomas

[11] Patent Number: 4,777,354
[45] Date of Patent: Oct. 11, 1988

[54] SYSTEM FOR CONTROLLING THE SUPPLY OF UTILITY SERVICES TO CONSUMERS

[76] Inventor: Barry Thomas, 3125 Military Rd., NW., Washington, D.C. 20015

[21] Appl. No.: 823,048

[22] Filed: Jan. 27, 1986

[51] Int. Cl.⁴ .............................................. G06K 5/00
[52] U.S. Cl. .................................... 235/380; 235/487
[58] Field of Search ................................ 235/380, 487

[56] References Cited

U.S. PATENT DOCUMENTS 4,237,376  12/1980  Giacomotti ........................ 235/487
4,629,874  12/1986  Pugscey ............................ 235/380

Primary Examiner—Harold J. Pitts
Attorney, Agent, or Firm—Murray and Whisenhunt

[57] ABSTRACT

System for controlling the supply of utility services, such as electricity, gas, water, and oil, and other services, such as telephone, cable television, and the like to a consumer. The system includes one or more service supply control units for controlling the supply of the service to a consumer location over a predetermined time period. A timing device is connected to the supply control unit for setting the time period over which the supply control units supply the service to the consumer. A deactuating device is connected to the supply control units for effecting termination of the supply of the service upon expiry of the predetermined time period. An actuator card is provided for actuating the supply control units.

12 Claims, 3 Drawing Sheets

FIG. 3
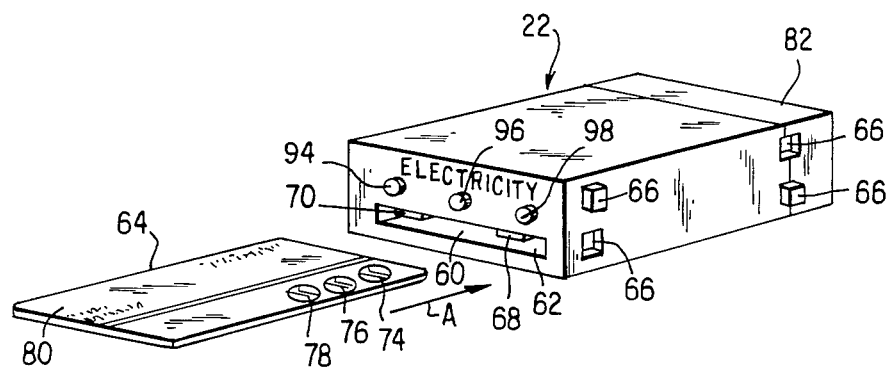
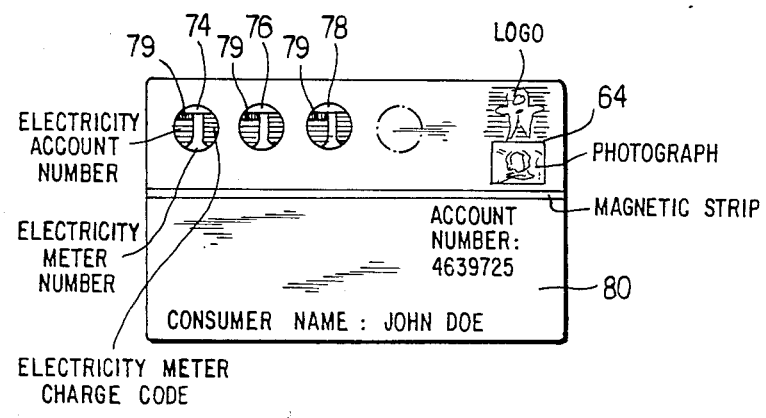
FIG. 4

SYSTEM FOR CONTROLLING THE SUPPLY OF UTILITY SERVICES TO CONSUMERS

The present invention relates to a system for for controlling the supply of services, such as electricity, gas, water, oil, telephone services, cable television, or the like to a consumer.

BACKGROUND OF THE INVENTION

In recent years, there has been a significant increase in the use of automatic vending equipment systems for vending consumer goods and other commodities such as, for example, gasoline. Many of these systems involve the use of an appropriately pre-programmed credit card which not only actuates the system, but also allows for communication with a central computer to facilitate identification of the consumer and enable appropriate accounting at the completion of the sale.

U.S. Pat. No. 3,872,438 describes an automatic vending system designed for use either with equipment which sells individual articles or with bulk dispensing equipment, such as gasoline pumps. The system includes a special credit card construction which is precoded with information relating to the consumer. A validating mechanism is also provided for ensuring that the card is being used by a purchaser to whom the card was originally issued, to reduce the risk of fraudulent use of the card by an unauthorized person.

U.S. Pat. No. 4,120,452 discloses a vending system which is particularly suited for installation in hotels or the like for permitting guests to buy articles in a refrigerator or vending machine located in a guest room without the use of coins. The guest is provided with a key holder which includes a memory, and the key holder is used to actuate the vending machine to dispense the desired articles. The vending system is also able to calculate the sum of the articles sold, and to prepare an appropriate bill for the guest.

U.S. Pat. No. 4,395,626 describes a system for use in a gasoline station for automatically actuating the fuel pumps using a customer credit card. A remote customer controlled console is located at a gasoline dispensing island, and a selected gasoline pump is actuated by the customer inserting a credit card into the console. The console is in communication with a central computer, and permits the customer to provide "collateral" prior to operating the fuel pump. In this way, "drive-offs" in which a driver refuels the vehicle and then drives away without paying are minimized.

U.S. Pat. No. 4,436,992 describes a device for validating a plastic card for operating postage meters. This permits replenishment of the postage meter without having to take the meter to the Post Office.

As is clear from the above discussed prior patents, the use of cards for actuating vending systems is old. The systems in the above patents facilitate either the dispensing of specific consumer items such as prepackaged food, or materials such as gasoline, or enable reactuation of a postage meter after a particular monetary charge has been depleted. None of the above prior developments is concerned with a system for enabling the supply to a consumer of utility services including electricity, gas, water or oil, or other services such as telephone or cable television, over a particular desired time period.

OBJECTS OF THE INVENTION

In view of the above, one of the objects of the present invention is to provide a system for controlling the supply of services to consumers which eliminates the need for existing traditional metering and billing systems.

Another object of the present invention is to provide a system for controlling the supply of services to consumers in which the consumer employs an actuator card, which may also function as a credit card for communicating with a main computer to facilitate accounting, payment and billing and for actuating the system to supply the service to the consumers, either over a predetermined time period such as for example a 30-day billing period, or on the basis of prepaid services, for example one hundred dollars worth of electricity paid for prior to supply of the services to the consumer.

It is yet another object of the present invention to provide a vending system including one or more individual service supply control units disposed at a desired consumer location, for example in the consumer's home, each control unit being actuated by an appropriately programmed actuator card to supply the service to the consumer location either over a predetermined time period, or on the basis of a pre-paid amount of services such as mentioned above.

SUMMARY OF THE INVENTION

In accordance with the above objects, the present invention provides a system for controlling the supply of services to a consumer, including, but not limited to, utility services, such as electricity, gas, or oil or other services and commodities such as water, telephone, cable television or the like. According to one embodiment of the system comprises at least one service supply control unit for controlling the supply of the service to a particular desired consumer location over a predetermined time period. A timing device is connected to the supply control units for timing the predetermined time period over which the supply control units supply the service to the consumer. A deactuating means is connected to the supply control units to enable the service(s) to be supplied to the consumer over the predetermined time period. An actuator card may be used for actuating the supply control units.

BRIEF DESCRIPTION OF THE DRAWINGS

Embodiments of the present invention will now be described with reference to the accompanying drawings, in which:

FIG. 3 is a perspective view of a service supply control unit and actuator card;

FIG. 4 is a front view of the actuator card shown in FIG. 3; and

DETAILED DESCRIPTION OF THE INVENTION

For purposes of definition, the term "service" used throughout this case is intended to cover not only utility services supplied to the consumer, including, for example, electricity, gas and oil, but also other consumer services such as, for example, telephone services, water, cable television, and the like.

Figure 1:
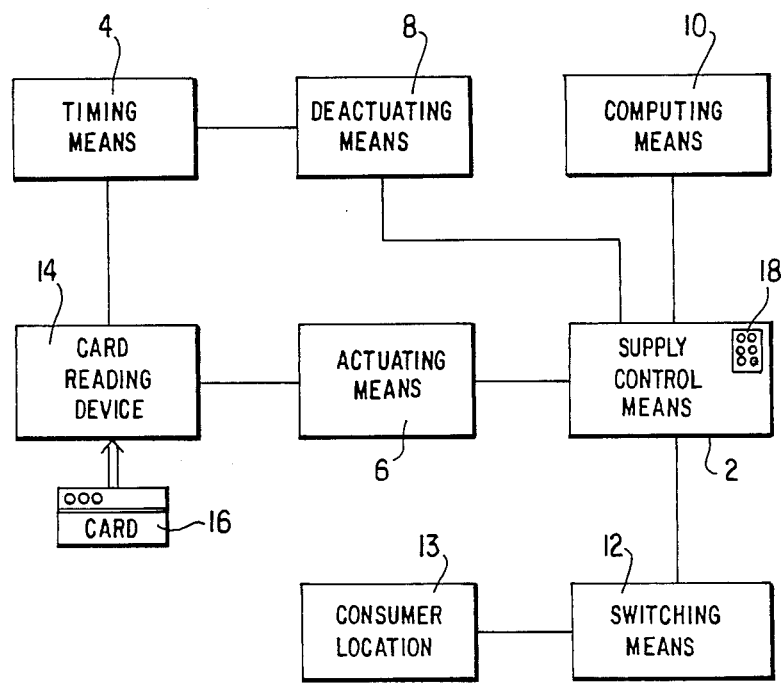
FIG. 1 is a block diagram of the system of the invention.
Figure 2:
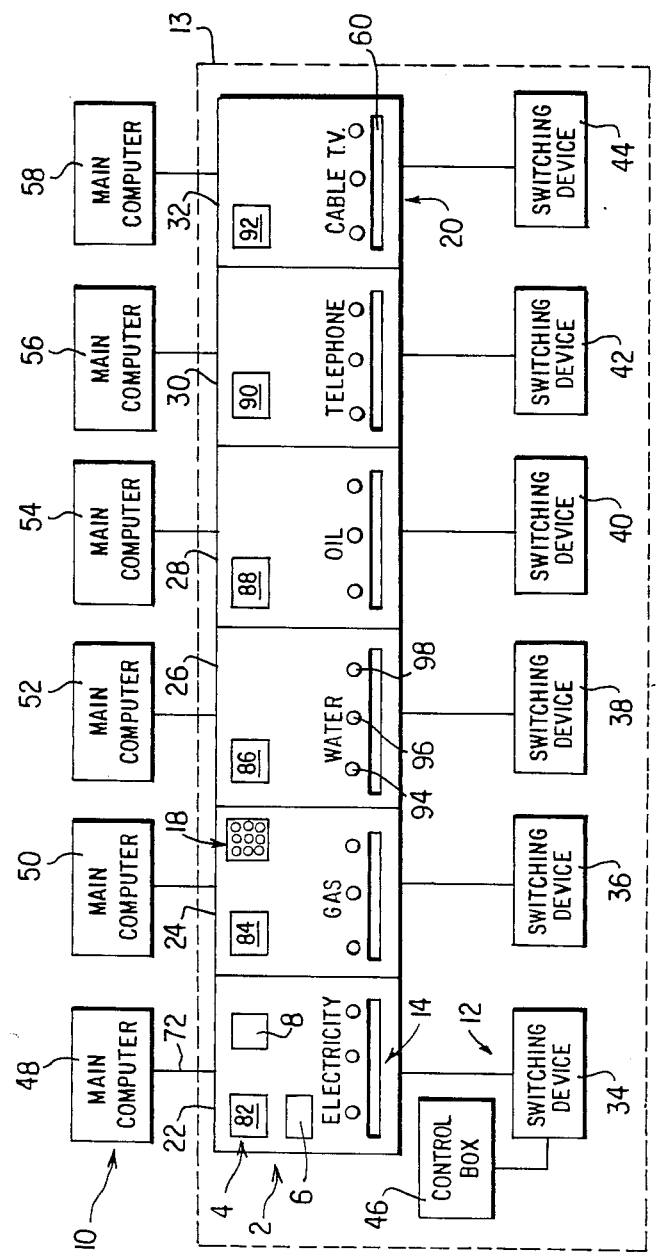
FIG. 2 is a more detailed block diagram of an embodiment of the system of the invention.

Referring, now, to FIGS. 1 and 2, there are shown block diagrams of an embodiment of the system of the present invention. The system includes a service supply control means 2, for example a microcomputer, for controlling the supply of services to a consumer location 13 over a predetermined time period, a timing means 4 for timing the period over which the supply control means supplies services, an actuating means 6 and a deactuating means 8, typically switching devices, for actuating and deactuating the supply control means, a computing means 10, and a service supply switching means 12, for example a valve or solenoid, for enabling services to flow from the supplier to the consumer location. The system also includes a card reading device 14 for reading indicia on an actuator card 16. The system may also include if desired a keyboard 18 for keying information known to the consumer into the system, such as, for example, a code known only to the consumer to avoid unauthorized use of the card.

Referring, specifically, to FIG. 2, there is shown panel 20 including a series of individual service supply control units 22, 24, 26, 28, 30 and 32, designated respectively "Electricity", "Gas", "Water", "Oil", "Telephone" and "Cable TV". Each of the supply control units is connected to a respective switching device 34, 36, 38, 40, 42 and 44 for permitting supply of the associated service from the supplier to the desired consumer location. For example, with regard to the supply of electricity, actuation of the "Electricity" supply control unit 22 with actuator card 16 causes the switch 34 to open and allow electricity to flow from the electricity supply source to the consumer's control box 46. In this regard, it will be appreciated that the switch 34 may be separate from the control box 46 or may be incorporated within the control box 46, as desired. The switching devices 36 through 44 are similarly actuated by the respective supply control units 24 through 32 to enable the respective services to be supplied to the consumer's home.

According to this embodiment, each of the supply control units 22 through 32 is connected to a respective main computer 48, 50, 52, 54, 56 and 58. Typically, each of the main computers 48 through 58 is located within the organization responsible for supplying the particular service, for example the accounting and billing department of the service supply organization. It is not critical, however, for the supply control units to be connected to a main computer, as will be described in more detail later with reference to FIG. 5.

FIG. 3 illustrates an individual supply control unit, for example the "Electricity" supply control unit 22, in more detail. The unit 22 comprises a card reading device 60 disposed at a convenient location in the unit. The card reading device 60 may be any conventional card reading device such as one of those described in the above-identified U.S. Pat. Nos. 3,872,438; 4,120,452 and 4,395,626. For completeness, the disclosures of all of those three patents are specifically incorporated by reference into the present application. The card reading device 60 includes a card receiving slot 62 for receiving a customer actuator credit card 64 in a sliding fashion as shown by arrow A in FIG. 3. It will be appreciated that the slot may be disposed horizontally such as that shown in FIG. 3, or may be vertically disposed such as in the arrangement shown in FIG. 3 of U.S. Pat. No. 4,395,625. The supply control unit 22 is also provided with connecting devices 66 on one or more sides(only one side is shown for clarity)for facilitating side-by-side attachment of a plurality of units to form the panel as shown in FIG. 2.

Each card receiving slot 62 is provided with reading heads 68, 70 for generating one or more signals corresponding to information carried by the card 64 when it is inserted into the slot 62. The card reading device 60 via heads 68, 70 collects the information from the card, and then transmits that information along connecting line 72, for example a telephone line, to the associated main computer 48 for metering, validation, accounting, billing or other desired purposes.

The actuator card 64 is shown in more detail in FIG. 4. The actuator card includes one or more memory devices 74, 76, 78, which may be in the form of chip discs, magnetic strips or other suitable means capable of storing coded information, such as, for example, an electricity accounting number, an electricity meter number and an electricity meter charge code (see FIG. 4). Suitable identifying information may also be provided in the area 80, such as the consumer's name, address and other pertinent data. It will be appreciated that the actuator card may be specific to a particular supply control unit, and therefore may contain only one memory device, or may incorporate a plurality of memory devices, each programmed to actuate a specific supply control unit to switch on a switching device and/or a timing device or to effect meter reading if desired, and communicate with the respective main computer. It will also be appreciated that the actuator card may be dispensed with when the system is connected to a main computer, since actuation and deactuation of the supply control unit may be controlled directly from the main computer. However, the use of an actuator card is preferred since this gives the consumer more control and security over the consumption of services, especially in conjunction with the keyboard 18.

A timing device 82, 84, 86, 88, 90, 92 is connected to each of the supply control units 22 through 32. The timing device may be any conventional timing device such as a pulse counting means or similar device, and may be incorporated within the unit, as represented schematically in FIG. 2, or may be attached to the exterior of the unit as shown in FIG. 3. The timing device enables the supply control unit to operate over a predetermined time period, for example a billing period as arranged by the particular service supplier, so that services are provided to the consumer over that time period. At the expiry of the predetermined time period, the timing device effects termination of the supply of services, for example by transmitting a signal to a deactuating means such as a switch which transmits a signal to the supply control unit causing the control unit to switch off the switching device 34.

In order to apprise the consumer of the amount of service available within a particular time period, indicator means such as lights 94, 96, 98 are provided on each supply control unit. While variations may be chosen as appropriate, as a typical example, the indicator light 94 may be a green light which is actuated at the beginning of a predetermined time period and indicates service is available to the consumer. Indicator light 98 may be a red light which is actuated when the predetermined time period has expired and the supply control unit causes termination of the supply of the services to the consumer location until the control unit is reactuated.

The indicator light 96 may be a yellow light which is actuated prior to actuation of the red light to warn the consumer that expiry of the predetermined time period is approaching and that "recharging" to initiate another predetermined time period will be required shortly. In this regard, the card 64 may include an emergency supply portion 79 in the respective memory devices which can be used to actuate the system for a short period of time (e.g. 2-3 days), in the event it is not possible to recharge the card (e.g. due to bad weather making it difficult to take the card to a recharging terminal). The emergency portion 79 may be arranged so that for example the supply control unit can be actuated by the emergency portion only when the yellow light is actuated, in order to avoid premature depletion of the emergency portion.

Alternatively, operation of the red and yellow lights may be arranged so as to obtain overlapping of the time when the yellow and red lights are actuated. This would warn the consumer of the need to recharge the system in order to avoid termination of the services. Another alternative mode of operation would be to arrange for the yellow light to blink just prior to actuation of the red light, or to arrange for the red light to begin blinking while the yellow light is still actuated. In all of the above alternative, it would also be possible to incorporate an audible device such as a buzzer, for those consumers who are suffering from color blindness or other vision deficiencies.

Figure 5:
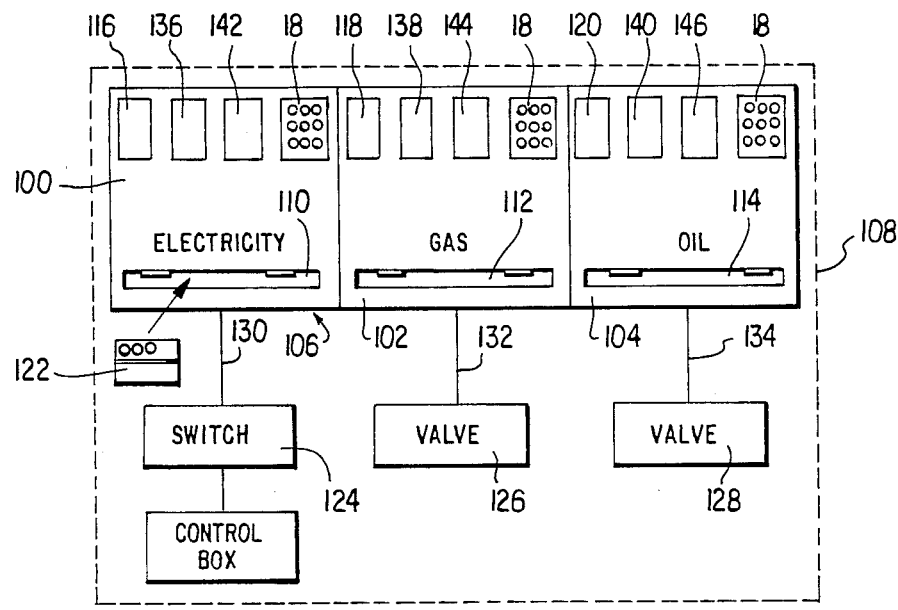
FIG. 5 is a block diagram of another embodiment of the system of the invention.

An alternative embodiment of the system of the invention is illustrated in FIG. 5. That embodiment includes three supply control units 100, 102, 104 connected together in the form of a panel 106. It will be appreciated that the panel 106 may include more or less supply control units, depending on the number of services being supplied to the consumer location 108 employing the system of the invention. In this embodiment, the suppply control units 100, 102 and 104 are not linked to a main computer (in contrast to the system described earlier and illustrated in FIG. 2), so that the supplier of services does not have a means for directly communicating with the supply control units. Each supply control unit includes a card reading device 110, 112, 114 which are each similar to the card reading device 60 described in detail earlier. Each supply control unit 100, 102, 104 includes an actuating device 116, 118, 120 which is actuated when an actuator card 122 is introduced into one of the card reading devices 110, 112, 114. Actuation of the actuating device 116, 118, 120 causes opening of the switch 124 or valve 126, 128, such as, for example by the transmission of a actuating signal along connecting line 130, 132, 134 to the respective switch or valve. The supply control units 100, 102, 104 include a timing device 136, 138, 140 incorporated within each unit as represented schematically by FIG. 5, or attached to the exterior of the unit in a way which is similar to that shown in FIG. 3. The timing device may be any conventional timing device such as a pulse counting means or similar device, and operates to time the period over which services are supplied to the consumer location 108. Upon expiry of the time period, the timing device effects termination of the supply of services, for example by transmitting a signal to a deactuating means 142, 144, 146 (which may be a switching device), which transmits a signal to the supply control unit causing the control unit to switch off the switch or valve 124, 126, 128.

Operation of the system of the invention will now be described with reference to the embodiments illustrated in FIGS. 1 through 4. A consumer who wishes to obtain one or more services supplied to the consumer's home inserts the charged actuator card into the slot 62 of the card reading device 60 associated with a supply control unit, say 22. The reading heads 68, 70 sense the information contained on the card and communicate the information to the respective main computer 48 via connecting line 72. After receiving the information, the main computer checks to ensure the information is correct and correlates it with data already stored in the computer relating to that particular consumer. Assuming nothing adverse materializes in this checking process, such as, for example, a discovery that the consumer is in arrears in his bill payments, the computer 48 transmits information to the control unit 22 to facilitate actuation of the unit, for example by transmitting a signal to the actuating means 6 to render the unit 22 operative. When the unit is actuated, the green light 94 is switched on and the switching device 34, for example a valve or solenoid, is energized to permit services to be received by the consumer. The timing device 74 is also actuated at this point by an appropriate signal, either from the main computer 48, or from the actuating means 6, in order to time the forthcoming period of operation of the supply control unit 22. At a predetermined time prior to expiry of the total time period of operation of the supply control unit, for example 3 days prior to expiry, the timing device, or the supply control unit, or the main computer, as may be preferred, transmits a signal to the supply control unit to actuate the warning light (yellow) 96 (and/or optionally to an audible warning means such as a buzzer (not shown), to warn the consumer that the current period is close to expiry, and that "recharging" for a further supply period will be required shortly. Finally, upon expiry of the time period, the deactuating means 8 is actuated by a signal from the supply control unit, the main computer, or the timing device, as desired, and the deactuating means transmits a signal to the supply control means to switch off the switching device 34, thereby terminating the supply of services to the consumer. The supply control unit, timing device or main computer also transmits a signal to actuate the red light 98 (and buzzer, if present) to advise the consumer of termination of the supply of services. Reactuation of the supply control unit is achieved by initially "recharging" the actuator card 64, and then inserting the card into the card reading device as described above.

The actuator card 64 may be recharged by taking the card to the supplier of the respective services or to a recharging terminal located, for example, at a local bank or a supermarket. This enables the consumer to have the actuator card recharged to facilitate the supply of services by way of cash payment, or by credit arrangement or by way of conventional billing. Thus, the card may serve not only as an actuator card for actuating the supply control units, but also a credit card for facilitating payment for the supply of services. The recharging terminal may be any conventional card handling equipment capable of introducing information into one or more of the memory devices of the card. In the instance where the card contains a plurality of member devices such as as illustrated in FIG. 4, the recharging terminal will have the capability of distinguishing between the respective memory devices in order to enensure that the correct memory device is recharged.

In the system described above, a supply control unit is indicated as being associated with an individual service supply. However, it will be appreciated that each supply unit may be adapted to manage the supply of two or more services, as may be desired. Furthermore, in the instance where the supply control units are connected to a separate main computer, it will be appreciated that information handling, including metering, validating, accounting and billing may be handled for example by a single main computer, by appropriate programming and design modification.

The system of the present invention allows for normal payment for services already used by the consumer since the actuator card 52 can serve as a basis for payment as well as an actuating device for rendering the supply control unit operative. In addition, the customer pre-payment, either by way of cash payment or credit, for the supply of services over a predetermined future period of time is possible, if desired. The or each supply control unit controls the supply of the respective service to the consumer, and may meter the consumption of the services over a predetermined time period. Each unit may also, if desired transmit and receive information to the supplier via the main computer, read information from the actuator card and supply information to the actuator card in order to facilitate operation of the system.

In light of the above, the system of the present invention is designed to eliminate, or substantially reduce, the need for existing traditional service metering and billing systems. In particular, the present system may meter the consumption of services automatically and store the information in its memory system, thereby eliminating or substantially reducing the need for personnel to visit consumers' homes for the purpose of meter reading to determine the amount of services consumed over a respective billing period. In light of this, the amount of paperwork should be substantially reduced, as well as the incidence of computational errors. The system will have the capability of computing the amount of services supplied to the consumer over the appropriate time period, and of generating a bill in accordance with information transmitted either to the main computer or to the actuator card from the respective control units. In other words, the actuator card will have the capability of effecting a meter-reading function and storing in its memory device the information relating to the amount of services consumed by the consumer. That information is then read and utilized to generate a bill for the consumer when the card is taken for recharging at the recharging terminal.

I claim:

1. A system for controlling the supply of services to a consumer, said system comprising:
    a plurality of service supply control means for controlling the supply of respective services to a consumer location over respective predetermined time periods;
    an actuator card means for actuating said supply control means, said actuator card means including a plurality of individual programmable memory means each for storing respective coded information in relation to a respective service;
    said supply control means including actuator card reading means for reading respective coded information stored in said respective memory means on said actuator card means for generating data related to said respective coded information;
    timing means connected to said supply control means for timing each said respective predetermined time period over which said supply control means supplies said respective services to said consumer location.

2. A system according to claim 1 and further including actuating means connected to said supply control means for initiating the supply of respective services to said consumer location.

3. A system according to claim 1, and further including deactuating means connected to said supply control means for effecting termination of the supply of said respective services upon expiry of a said respective predetermined time period.

4. A system according to claim 1, wherein said supply control means includes indicator means for indicating to the consumer the amount of a respective service available to the consumer over a respective predetermined time period.

5. A system according to claim 4, wherein said indicator means includes a green light, a yellow light and a red light, said green light being actuated at the beginning of a said respective predetermined time period, said red light being actuated when said respective predetermined time period has expired, and said yellow light being actuated prior to actuation of said red light to warn the consumer that said respective predetermined time period is about to expire.

6. A system according to claim 3, wherein said deactuating means causes said supply control means to switch off a service supply switching means upon expiry of said respective predetermined time period.

7. A system according to claim 5, wherein said red light is actuated when said switching means is switched off by said supply control means.

8. A system according to claim 1, wherein said service supply control means are connected to a main computer, said main computer being capable of collecting and storing information relating to the consumption of respective services of a particular consumer, and also being capable of maintaining accounts and generating bills relating to the consumption of respective services by a particular consumer on the basis of information transmitted to the main consumer from said supply control means.

9. A system according to claim 1, wherein said supply control means includes a plurality of supply control units for controlling the supply of different services, said units being connected together in the form of a panel.

10. A system according to claim 9, wherein each of said supply control units is connected to a respective services supply switching device for controlling supply of the respective service to the consumer.

11. A system according to claim 9, wherein each said supply control unit is connected to an actuating device and a deactuating device, said data related to said coded information on said card being transmissible between said supply control unit, said actuating device, said deactuating device and said timing means to facilitate actuation and deactuation of said system.

12. A system according to claim 1, wherein said actuator card means is an actuator card for actuating the supply control means for a respective predetermined time period.

* * * * *

UNITED STATES PATENT AND TRADEMARK OFFICE
CERTIFICATE OF CORRECTION

PATENT NO. : 4,777,354

DATED : October 11, 1988

INVENTOR(S) : Barry THOMAS

It is certified that error appears in the above-identified patent and that said Letters Patent is hereby corrected as shown below:

Column 8 line 46 delete "consumer" and replace by --computer--

Signed and Sealed this

Twenty-eighth Day of March, 1989

Attest:

DONALD J. QUIGG

*Attesting Officer*  *Commissioner of Patents and Trademarks*